United States Patent [19]

Johannesen

[11] Patent Number: 4,457,412
[45] Date of Patent: Jul. 3, 1984

[54] BRAKE CONTROL MECHANISM
[75] Inventor: Donald D. Johannesen, South Bend, Ind.
[73] Assignee: The Bendix Corporation, Southfield, Mich.
[21] Appl. No.: 307,920
[22] Filed: Oct. 2, 1981
[51] Int. Cl.³ .............................................. B60K 41/24
[52] U.S. Cl. .................................. 192/13 A; 192/3 H; 137/598
[58] Field of Search ............ 192/3 H, 3 S, 3 N, 13 A; 137/598

[56] References Cited
U.S. PATENT DOCUMENTS
2,251,787  8/1941  Gardiner .......................... 192/13 A
2,658,592  11/1953  Polomski ........................... 192/3 H Primary Examiner—George H. Krizmanich
Assistant Examiner—M. Manley
Attorney, Agent, or Firm—Paul David Schoenle; Ken C. Decker

[57] ABSTRACT

A brake control mechanism (14) includes a housing (20) with a stepped bore (22). A valve member (44) cooperates with a seat (46) to close communication from a master cylinder (10) to a brake assembly (12) when a vehicle is going up a hill. An actuator assembly (78) is operatively coupled to a clutch assembly (16) and is comprised of a plate (50) to control operation of the valve assembly in response to actuation of the clutch assembly (16). The plate (50) includes a relatively small axial dimension and forms a central opening (54) for receiving the valve member (44).

5 Claims, 2 Drawing Figures

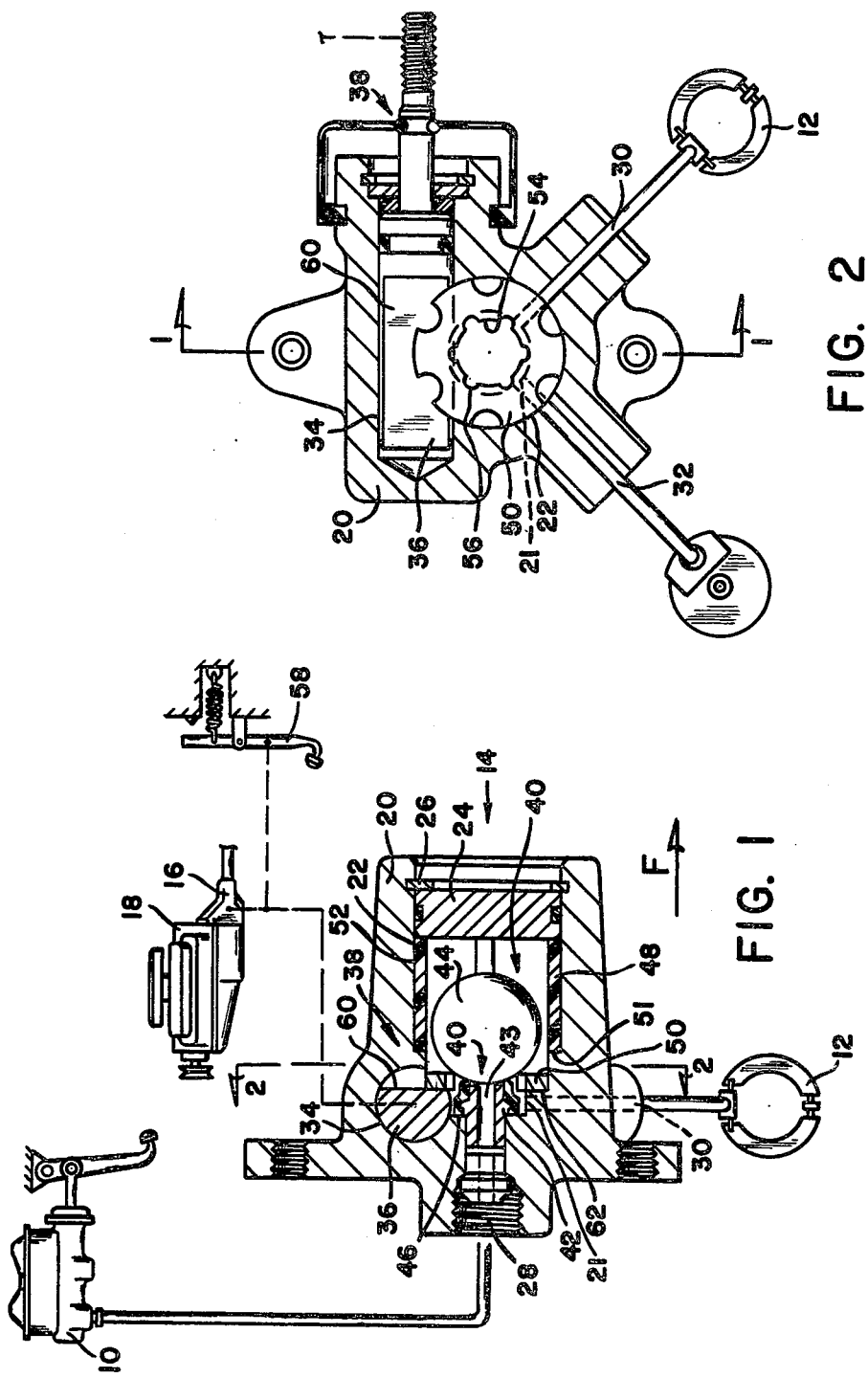

BRAKE CONTROL MECHANISM

This invention relates to a brake control mechanism, and, in particular, to a device disposed within a vehicle brake system to maintain at least one brake assembly in an applied condition subsequent to braking when the vehicle is stopped on a hill.

When a vehicle is stopped on a hill and the vehicle is provided with a clutch assembly to enable operation of a manual shifting transmission, a vehicle operator must simultaneously release a brake pedal, depress an accelerator pedal and gradually release a clutch pedal in order to prevent the vehicle from rolling back down the hill. This effort by the vehicle operator requires precise timing and therefore limits driving a vehicle with a manual transmission to only those vehicle operators who are proficiently adept at handling stops on hills. In order to make a vehicle with a manual transmission universally acceptable, or at least less demanding, it has been proposed to add a "hill-holder" or brake control mechanism which fluidly connects a master cylinder to at least one brake assembly. The brake control mechanism is operatively coupled to a clutch assembly so that once a brake application is made while the vehicle is on an incline and the clutch assembly is disengaged, that is, the clutch pedal is depressed, the fluid pressure communicated to the one brake assembly is trapped and maintained in a brake application mode even when the brake application is terminated. The one brake assembly is depressurized when the clutch assembly is engaged so that the transmission will couple with the engine to move the vehicle up the incline after the trapped brake pressure within the one brake assembly.

The brake control mechanism includes a housing which is disposed within an engine compartment. An angle sensing member and an actuator is disposed within the housing so that the size of the housing must be large enough to accept these parts. However, the size of future vehicles will be smaller with less engine compartment space. Also, the components of future brake control mechanisms must be simple to provide the economics necessary for affordable marketing to an end consumer.

The prior art is most recently illustrated in U.S. Pat. No. 4,247,154.

The present invention provides a brake control mechanism fluidly communicating a master cylinder with a brake assembly and operably connected to a clutch assembly, the mechanism comprising a housing defining a stepped bore therethrough, an inlet communicating the master cylinder with the stepped bore, an outlet communicating the stepped bore with the brake assembly, a valve assembly disposed within the stepped bore to open and close communication between the inlet and outlet and an actuator assembly operatively coupled to the clutch assembly and extending into the stepped bore to control operation of the valve assembly, characterized in that said actuator assembly includes a plate carried within the stepped bore, said valve assembly including a member movable in response to the angular orientation of the housing and a seat disposed within the stepped bore engageable with the member, to close communications between the inlet and the outlet said plate defining a central opening permitting said member to engage said seat when said actuator assembly is in a first position, and said actuator assembly is moveable to a second position to pivot said plate and move said member away from said seat to open communication the inlet open to the outlet.

It is an advantage of the present invention that the plate used for the actuator assembly can be substantially flat and pivotally disposed within the stepped bore to conserve space, thereby enabling a smaller brake control mechanism.

FIG. 1 is a side view of a brake control mechanism made in accordance with the present invention when coupled to a brake system; and FIG. 2 is a cross section view taken along line 22 of FIG. 1 and showing only the housing, the plate and a shaft cooperating with the plate for purposes of clarity A brake system for a vehicle traveling forward in the direction of arrow F is schematically shown in FIG. 1. The system includes a master cylinder 10, at least one brake assembly 12 and a brake control mechanism 14, sometimes referred to as a "Hill-Holder". The vehicle also is equipped with a manual shifting transmission clutch assembly 16 coupled to an engine 18. The brake control mechanism 14 comprises a housing 20 defining an axially extending stepped bore 22. A plug 24 is secured to the housing 20 by a snap ring 26 to close the step bore 22. The housing 20 includes an inlet 28 coaxial with the stepped bore 22 and a pair of outlets 30 and 32 intersecting the stepped bore 22 at a cylindrical surface 21. An opening of bore 34 leads to the stepped bore 22 and movably receives a shaft 36 forming a part of an actuator assembly 38.

A valve assembly 40 is disposed within the stepped bore 22 and is formed by a seat 42 and a valve member 44. The stepped bore defines a first shoulder 46 against which the seat 42 is secured via a press fit with the portion of stepped bore 22 adjoining the inlet 28. A valve member guide 48 extends between a shoulder 50 and the plug 24 to position and direct movement of the valve member 44 within the stepped bore in a manner described hereinafter. When the valve member 44 is in a first position, a spacing exists with the seat to open communication between the inlet 28 and the outlets 30 and 32 via the hole in the seat. In a second position, the valve member 44 engages the seat to close communication between the inlet 28 and the outlets 30 and 32.

In accordance with the invention, the actuator assembly 38 comprises the shaft 36 and a plate 50. The shaft 36 is operatively coupled to the clutch assembly 16 so that the shaft 36 rotates within the opening 34 in response to operation of the clutch assembly. As shown in FIG. 1, the opening 34 is located within the housing 20 so that its axis is substantially in axial alignment with the first shoulder 46 and also substantially in radial alignment with the large diameter surface 52 of the stepped bore 22. The plate 50 is provided with a central opening 54. A plurality of cut outs 56 on the edge of the central opening 54 define fluid passages; however, these cut outs 56 could be omitted provided free flow of fluid is possible between the edge of central opening 54 and the valve member 44 when engaged therewith. In the position illustrated in FIG. 1, a clutch pedal 58 is depressed to disengage the clutch assembly 16 and the shaft 36 is rotated so that a cam surface 60 on the shaft 36 is coplanar with a second shoulder 62 of the stepped bore. Consequently, the plate 50 is free to abut the cam surface 60 and the second shoulder 62 so that the disc shaped plate 50 is disposed within the stepped bore 22 with its major axis substantially perpendicular to the longitudinal axis of the stepped bore 22. If the clutch pedal 58 is released to engage the clutch assembly 16, the shaft 36 will be rotated counterclockwise in FIG. 1, so that the cam surface 60 will move the top part of plate 50 to the right, thereby pivoting the plate 50 clockwise about the bottom edge of shoulder 62. With the top of plate 50 displaced to the right, the valve member 44 will also be displaced to the right to remain spaced from seat 46, thereby maintaining the inlet 28 open to the outlet ports 30 and 32. Consequently, so long as the clutch pedal is released and the clutch assembly is engaged, the inlet 28 will always be open to the outlets 30 and 32 to communicate brake fluid pressure from the master cylinder 10 to the brake assembly 12.

When the vehicle remains substantially level, the valve member 44 is free to move between the seat 46 and the plug 24. With fluid flowing between the inlet and the outlets via the seat 46, the valve member 44 will remain spaced from the seat so that the inlet 28 will remain open to the outlet. If the vehicle is going up a hill, the valve member 44 will move downward within the stepped bore 22 to abut the seat 46. During braking, increasing fluid pressure urges the valve member slightly away from the seat 46 to communicate fluid pressure to the brake assembly 12. When the fluid pressure reaches a stabilized pressure level, the valve member 44 moves within the stabilized pressure media to engage the seat 46. Upon termination of braking with the clutch disengaged and the vehicle remaining on a hill, the decreasing fluid pressure within the inlet 28 creates a pressure differential across the valve member 44 so that the latter is sealingly biased against the seat 46 to retain fluid pressure within the stepped bore down stream from the seat 46, and also within the brake assembly 12. Therefore, the vehicle, which is on a hill with the clutch pedal depressed to disengage the clutch assembly, will be braked so that it will not roll down the hill. When the vehicle operator wants to continue up the hill, he gradually releases the clutch pedal so that the actuator assembly 38 is actuated to rotate the shaft 36 counterclockwise. The cam surface biases the plate 50 to pivot and move the valve member away from the seat 46, so that the brake assembly 12 is depressurized. However, at the same time the vehicle operator is accelerating so that the engine 18 takes over upon depressurization of the brake assembly 12 to move the vehicle up the hill.

The valve member 44 will remain spaced from the seat 46 so long as the clutch assembly is engaged and the plate 50 is retained in its pivoted position by the cam 60. When the clutch assembly is disengaged, the valve member will only sealingly engage the seat when the vehicle is going up a hill and braking is terminated to create a pressure differential across the valve member.

With the actuator assembly including a plate 50 which defines a relatively small axial width, it is possible to shorten the axial length of the housing 20. Also, a further size reduction is possible when the plate 50 is provided with the central opening 54 to receive the valve member 44.

I claim:

1. A brake control mechanism fluidly communicating a master cylinder with a brake assembly and operably connected to a clutch assembly, the mechanism comprising a housing defining a stepped bore therethrough, an inlet communicating the master cylinder with the stepped bore, an outlet communicating the stepped bore with the brake assembly, a valve assembly disposed within the stepped bore to open and close communication between the inlet and outlet and an actuator assembly operatively coupled to the clutch assembly and extending into the stepped bore to control operation of the valve assembly, characterized in that said actuator assembly includes a plate pivotably carried within the stepped bore, said valve assembly including a member movable in response to the angular orientation of the housing and a seat disposed within the stepped bore engageable with the member to close communication between the inlet and the outlet, said plate defining a central opening permitting said member to engage said seat when said actuator assembly is in a first position, and said actuator assembly is movable to a second position to pivot said plate and move said member away from said seat to open communication between the inlet and the outlet, said actuator assembly further including a cam engageable with said plate to pivot the latter, said cam, plate, seat, and member being substantially aligned at an axial location within the stepped bore in order to compactly fit within the stepped bore and also to provide for the pivoting movement of said plate about the axial location when said actuator assembly is moved from the first position to the second position.

2. The brake control mechanism of claim 1 in which the stepped bore defines a first shoulder engageable with said seat to locate the latter within the stepped bore, said first shoulder intersects a bore extending substantially normal to the axis of the stepped bore and said actuator assembly in rotatably disposed within the bore adjoining said frist shoulder.

3. The brake control mechanism of claim 1 in which the stepped bore defines a first shoulder engageable with said seat and a second shoulder engageable with said plate, said outlet being disposed axially within the stepped bore between said first and second shoulders.

4. The brake control mechanism of claim 3 in which said first and second shoulders are connected by a cylindrical surface forming a diameter substantially equal in dimension to said plate central opening.

5. The brake control mechanism of claim 3 in which said valve assembly further includes a guide sleeve directing the axial movement of said member within the stepped bore and the stepped bore further defines a third shoulder engageable with said guide sleeve.

* * * * *